US005524219A

United States Patent [19]

Li

[11] Patent Number: 5,524,219

[45] Date of Patent: Jun. 4, 1996

[54] OPTICAL DATA PROCESSING SYSTEM PROVIDING FREE SPACE INTERCONNECTIONS THROUGH LIGHT PATTERN ROTATIONS, GENERATED BY A RING-DISTRIBUTED OPTICAL TRANSMITTER ARRAY THROUGH A CONTROL UNIT

[75] Inventor: Yao Li, Apt. 154, Pleasantview Dr., Piscataway, N.J. 08854

[73] Assignees: Yao Li, Piscataway, N.J.; Hamamatsu Photonics K.K., Shizuoka-ken, Japan

[21] Appl. No.: 201,083

[22] Filed: Feb. 24, 1994

Related U.S. Application Data

[63] Continuation of Ser. No. 654,474, Feb. 13, 1991, abandoned.

[51] Int. Cl.[6] ........................ G06F 15/00; G06F 15/163; G06F 15/173

[52] U.S. Cl. .................... 395/310; 340/825.05; 364/841; 364/845; 359/166; 372/16; 370/85.15; 395/800; 395/200.02

[58] Field of Search .................................... 395/800, 325; 340/825.05; 364/841, 845; 359/166; 372/16; 370/85.15

[56] References Cited

U.S. PATENT DOCUMENTS

| | | | |
|---|---|---|---|
| 4,654,890 | 3/1987 | Hasegawa et al. | 359/119 |
| 4,783,851 | 11/1988 | Inou et al. | 359/166 |
| 4,905,229 | 2/1990 | Kato | 370/85.7 |
| 4,946,244 | 8/1990 | Schembri | 359/127 |
| 5,008,881 | 4/1991 | Karol | 370/85.15 |
| 5,023,463 | 6/1991 | Boardman et al. | 250/551 |
| 5,031,095 | 7/1991 | Hara et al. | 395/325 |
| 5,081,623 | 1/1992 | Ainscow | 370/85.4 |
| 5,124,546 | 6/1992 | Hu | 250/216 |
| 5,150,245 | 9/1992 | Smithgall | 359/117 |
| 5,247,381 | 9/1993 | Olmstead et al. | 359/118 |

OTHER PUBLICATIONS

Lea, "Bipartite Graph Design Principle for Photonic Switching Systems," IEEE Transactions on Communications, vol. 38, No. 4, Apr. 1990, pp. 529–538.

Bell, "Technology 1991 Telecommunications," IEEE Spectrum, Jan. 1991, pp. 44–47.

*Primary Examiner*—Thomas G. Black

*Assistant Examiner*—Hosain T. Alam

*Attorney, Agent, or Firm*—Finnegan, Henderson, Farabow, Garrett & Dunner

[57] ABSTRACT

An optical ring data distribution interconnect network system has a control unit that provides process data to a plurality of processing elements positioned about a reference circle to form a ring array and a coupled to the control unit for optically processing the processed data. A plurality of interconnects connect the processing elements to one another. According to none embodiment of the present invention, each interconnect includes input means coupled to the control unit to provide an input plurality of non-overlapping pixels. Each pixel is positioned one rotation unit from adjacent pixels. Each pixel is positioned one rotation unit for adjacent pixels along a reference circle forming a ring. A first prism means is coupled to the input means and has a first reflection base plane to generate a reflected optical data array. A second prism means is optically aligned with the first prism means is cascade and has a second reflection base plane having an axis inclined at an angle with respect to the axis of the first reflection base plane to generate an output optical data array. The position of each pixel of the output optical data array is shifted with respect to the position of a corresponding pixel of the input optical data array by one or more rotation units depending on the angle of inclination.

11 Claims, 4 Drawing Sheets

NEAREST-NEIGHBOR N=16

BARREL SHIFTER N=16

CHORDAL RING N=16 w=3

4-CUBE N=16

OPTICAL DATA PROCESSING SYSTEM PROVIDING FREE SPACE INTERCONNECTIONS THROUGH LIGHT PATTERN ROTATIONS, GENERATED BY A RING-DISTRIBUTED OPTICAL TRANSMITTER ARRAY THROUGH A CONTROL UNIT

This application is a continuation, of application Ser. No. 07/654,474, filed Feb. 13, 1991, now abandoned.

BACKGROUND OF THE INVENTION

1. Field of the Invention

This invention relates to a computer system of a single-instruction-multiple-data (SIMD) type having a plurality of processing elements, more particularly to its optical processing element topology.

2. Discussion of the Prior Art

A single-instruction-multiple-data (SIMD) machine is a computer system that consists of a control unit, N processing elements (PEs) and an interconnect network. Each processing element has its own local memory and registers, and simultaneously executes an identical instruction. The interconnect network provides a communication link for the processing elements. The control unit provides or broadcasts control and communication commands to the processing elements.

The SIMD machine is of particular interest in arithmetic computations, such as matrix-vector processing, digital Fourier transformation, data sorting, as well as in various image processing applications. However, since the SIMD processing environment requires an identical processing or interconnect to be performed at each time cycle, for a machine having a large number (large N) of processing elements and a fast clock rate, interconnect latency results in processing bottlenecks.

To solve this problem, various optical guided-wave and free-space interconnect architectures have been proposed. A common feature of these types of interconnects is that the processing data and/or the processing elements are distributed as a rectangular array. This rectangular array topology has lead; and to successful implementations of some types of networks such as the Optical Perfect Shuffle network and the Cross-over Interconnect network. However, the optical implementation of other important types of interconnect networks, such as the Nearest-neighbor Interconnect (NNI), the Barrel-shifter Interconnect (also known as the plus-minus $2^i$ (PM2I) Interconnect), the Chordal Ring Interconnect (CRI), and the Hyper-Cube Interconnect (HCI) networks, has not been successful.

The rectangular array topology has a major problem in that its optical implementation requires the use of both shift-in-variant and shift-variant optical elements in the network. For example, the NNI and PM2I networks require linear space invariant operations for their center processing elements and space variant (or wraparound) operations for their edge and corner processing elements. The use of state-of-the-art multifaceted computer-generated-holograms has been proposed to solve the problem. However, even with the use of the holograms, the rectangular array topology still has interconnect latency (or clock-skew) problems in that signals transmitted through different space-invariant and space-variant elements in the interconnect network undergo different delays, thus seriously limiting the processing rate of the SIMD machine.

SUMMARY OF THE INVENTION

An object of the present invention is to overcome the problems and disadvantages of the prior art by the use of simple optical processing element distribution topology.

Another object of the present invention is an optical ring array instrument system that can be reliably implemented with conventional space-invariant optical elements such as lenses and prisms as well as holograms.

These and other objects of the present invention are attained by a data processing system comprising a control unit for providing process data, a plurality of processing elements, and a plurality of interconnects for connecting the processing elements to one another in a ring array, the processing elements bring coupled to the control unit for optically processing the process data.

According to another embodiment of the present invention, each interconnect of the data processing system includes input means, coupled to the control unit, for providing an input optical data array representing the process data and having a plurality of non-overlapping pixels, each pixel having a position distanced one rotation unit from positions of adjacent pixels along a circle forming a ring; a first prism means coupled to the input means and having a first reflection base plane for generating a reflected data array; and a second prism means optically aligned with the first prism means in cascade and having a second reflection base plane having an axis inclinable at an angle with respect to the axis of the first reflection base plane for generating an output data array. The position of each pixel of the output data array is shiftable along the circle with respect to the position of a corresponding pixel of the input data array by one or more rotation units depending on the angle of inclination.

According to yet another embodiment of the present invention, the interconnect of the data processing system includes input means, coupled to the control unit, for providing an input optical data array representing the process data having a plurality of non-overlapping pixels, each pixel having a position distanced one rotation unit from positions of adjacent pixels along a circle forming a ring array; a first prism means coupled to the input means and having a first reflection base plane for generating a reflected optical data array; and a plurality of second prism means coupled to the first prism means, each second prism means corresponding to a different optical routing path and having a second reflection base plane having an axis inclinable at an angle with respect to the axis of the first reflection base plane for generating an output optical data array. The position of each pixel of each output optical data array is shiftable along the circle with respect to the position of a corresponding pixel of the input optical data by one or more rotation unit depending on the angle of inclination.

The accompanying drawings, which are incorporated in and constitute a part of this specification, illustrate the above and other embodiments of the invention and together with the description, serve to explain the principles of the invention.

BRIEF DESCRIPTION OF THE DRAWINGS

FIG. 2(*b*) is a schematic diagram of a ring array topology for the barrel shifter interconnect network;

FIG. 2(*c*) is a schematic diagram of a ring array topology for the chordal ring interconnect network;

FIG. 2(*d*) is a schematic diagram of a ring array topology for the 4-cube interconnect network;

DESCRIPTION OF THE PREFERRED EMBODIMENTS

Reference will now be made in detail to the present preferred embodiment of the invention, an example of which is illustrated in the accompanying drawings. Wherever possible, the same reference numbers will be used throughout the drawings to refer to the same or like parts.

Figure 1:
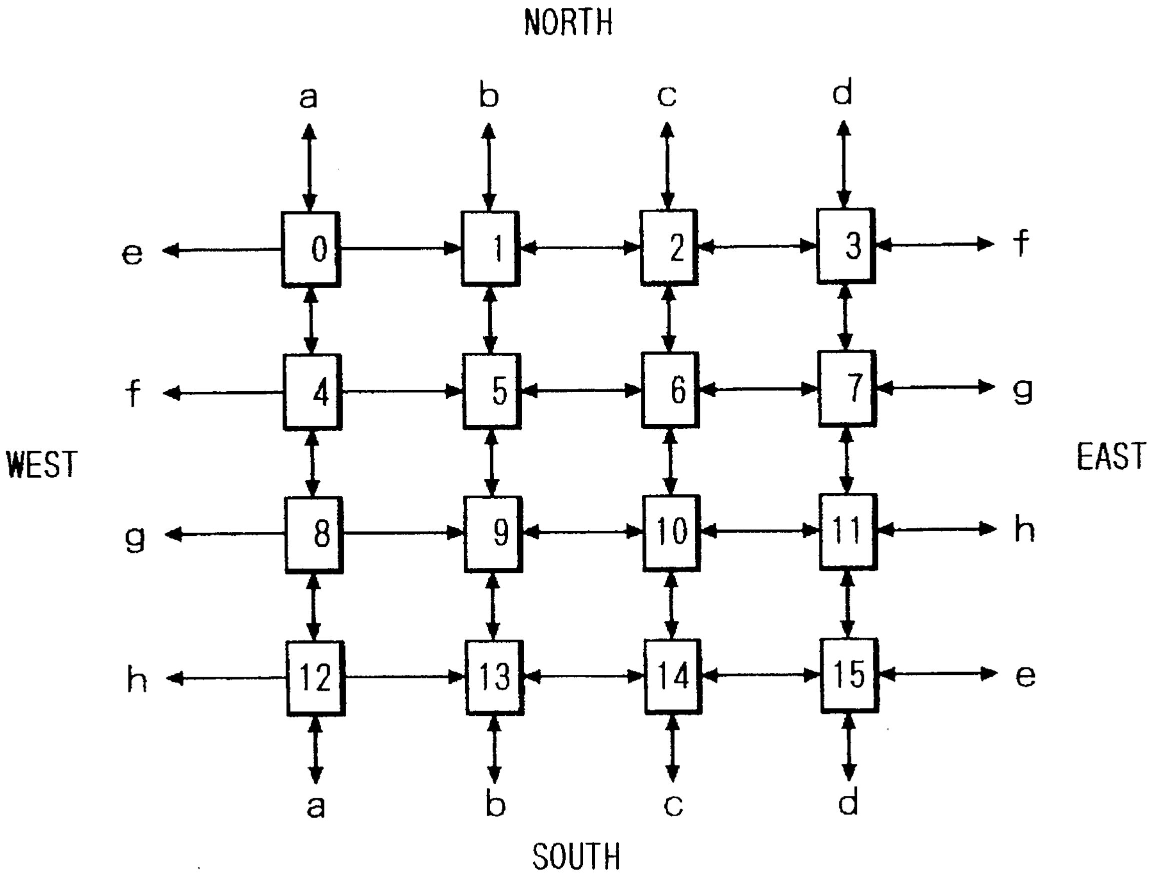
FIG. 1 is a schematic diagram of a prior art rectangular array topology.
Figure 2A:
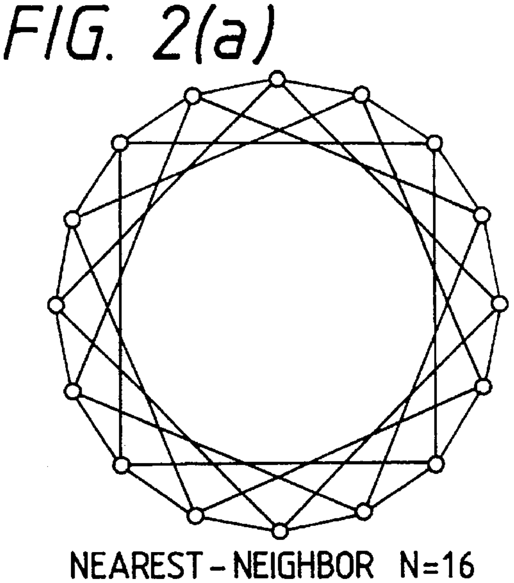
FIG. 2(*a*) is a schematic diagram of a ring array topology for the nearest-neighbor interconnect network.
Figure 2B:
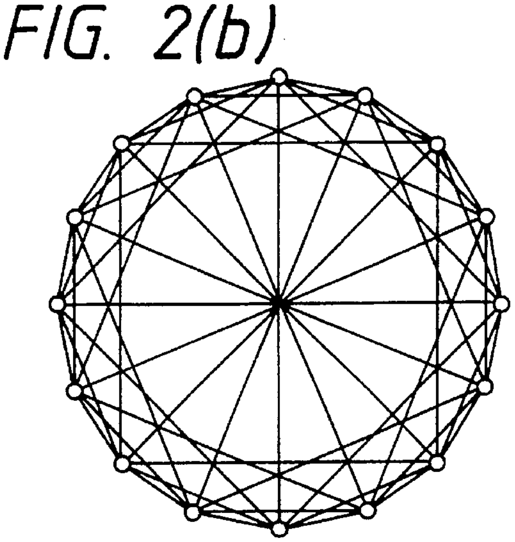
Figure 2C:
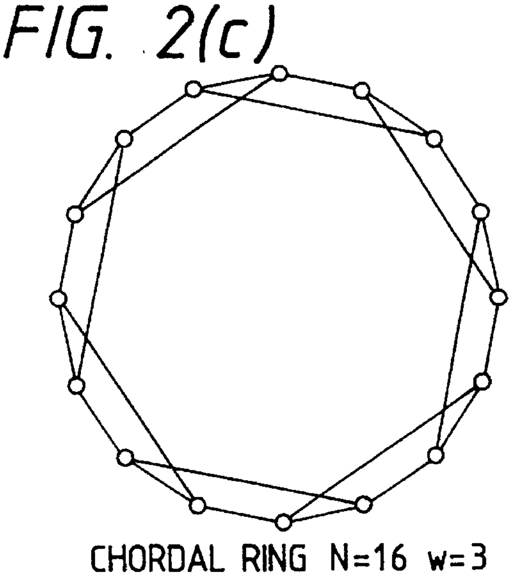
Figure 2D:
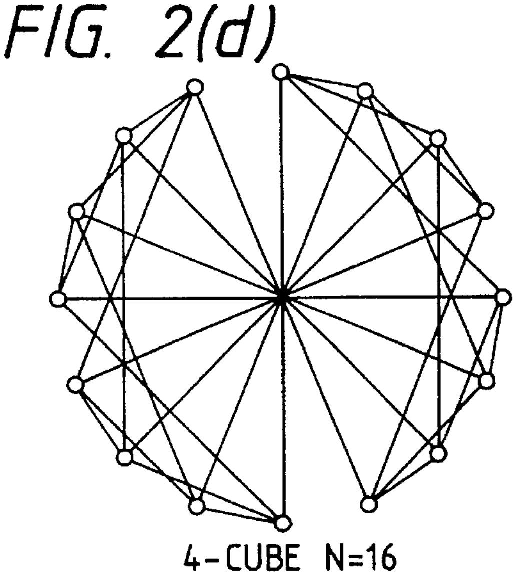

To delineate the difference between the prior art system and preferred embodiments of the present invention, the implementation of a conventional near-neighbor interconnect (NNI) network is described in reference to FIG. 1.

The NNI network is usually implemented with a IIHac IV system, and provides for each of its N processing elements four routing interconnect functions $R_{\pm 1,\ \pm r}$ (i):

$$R_{\pm 1}(i)=(i+1) \bmod N \tag{1a}$$

$$R_{\pm r}(i)=(i+r) \bmod N \tag{1b}$$

where $\tau=\sqrt{N}$ is a positive integer, and $0 \leqq i \leqq N-1$. When N processing elements are distributed as $\tau \times \tau$ square array.

FIG. 1 shows such an NNI network for sixteen (or N=16) processing elements 0–15 arranged in rows e–h and columns a–d. Each of the N processing elements 0–15 is connected to its north, south, east, and west neighbors in a rectangular array. For the optical implementation of this type of interconnect network of rectangular array topology, a space-invariant neighboring communication for interior processing elements 5, 6, 9 and 10, and a space-variant global communication for edge processing elements 1, 2, 4, 7, 8 and 11 and corner processing elements 0, 3, 12 and 15 must be established, requiring nine (9) different types of interconnect modules (one for the interior processing elements, four for the corner processing elements and four for the edge processing elements).

FIGS. 2(*a*), 2(*b*), 2(*c*), and 2(*d*) show an alternative ring distributed processing element array for sixteen (N=16), for example, processing elements of the NNI network, the barrel shifter interconnect (PM2I) network, the chordal ring interconnect (CRI) network with a chord length w=3, and the hyper-cube interconnect (HCI) network, respectively. This ring array interconnect topology requires only two different rotation-invariant operations, thus reducing complexity and significantly simplifying the optical implementation not only for the NNI network, but also of other types of interconnect networks such as the CRI, PM2I and HCI networks.

For example, regardless of its size, the optical implementation of the CRI network of the ring array topology requires two different rotation variant operations. The PM2I and HCI networks of the ring array topology require $\log_2 N$ different rotation-invariant operations. For the CRI and HCI networks of the ring array topology, since not all of the processing elements perform an identical routing task, an additional masking operation for selecting the processing element to run specific tasks is needed.

As shown in FIGS. 2(*a*), 2(*b*), 2(*c*) and 2(*d*), since the NNI, PM2I and HCI networks each possesses an even number ($N=2^i$) of processing elements where i is an integer greater than unity, the CRI links any even number of processing elements. Conceptually, the HCI and PM2I interconnects are similar. The HCI network pattern is based on a logical nearest-neighbor operation, and the PM2I pattern is based on a modulo N addition/subtraction neighbor operation.

For the optical implementation of the ring array topology based interconnect, the following constraints are imposed: (1) to reduce the number of processing elements, only rotation-invariant optical elements are preferably used; (2) to maintain fast communication for each processing element, multi-bit parallel channels are preferably used; (3) to minimize interconnect cross-talk, particularly for a high density array, an optical point (rather than a collimated source) and an optical imaging (rather than a beam projection scheme) are preferably used; (4) to insure correct synchronization among the processing elements, optical latency (i.e., optical beam propagation delay) for each processing element and each routing path should be substantially identical; and (5) since the multiprocessor's interconnect must provide bidirectional communication between the processing elements, reversibility of the direction of the optical beam path should be maintained.

The interconnected system of the present invention, as embodied herein, is based on the optical free-space ring array topology, and incorporates the above constraints is described in more detail below.

Figure 3:
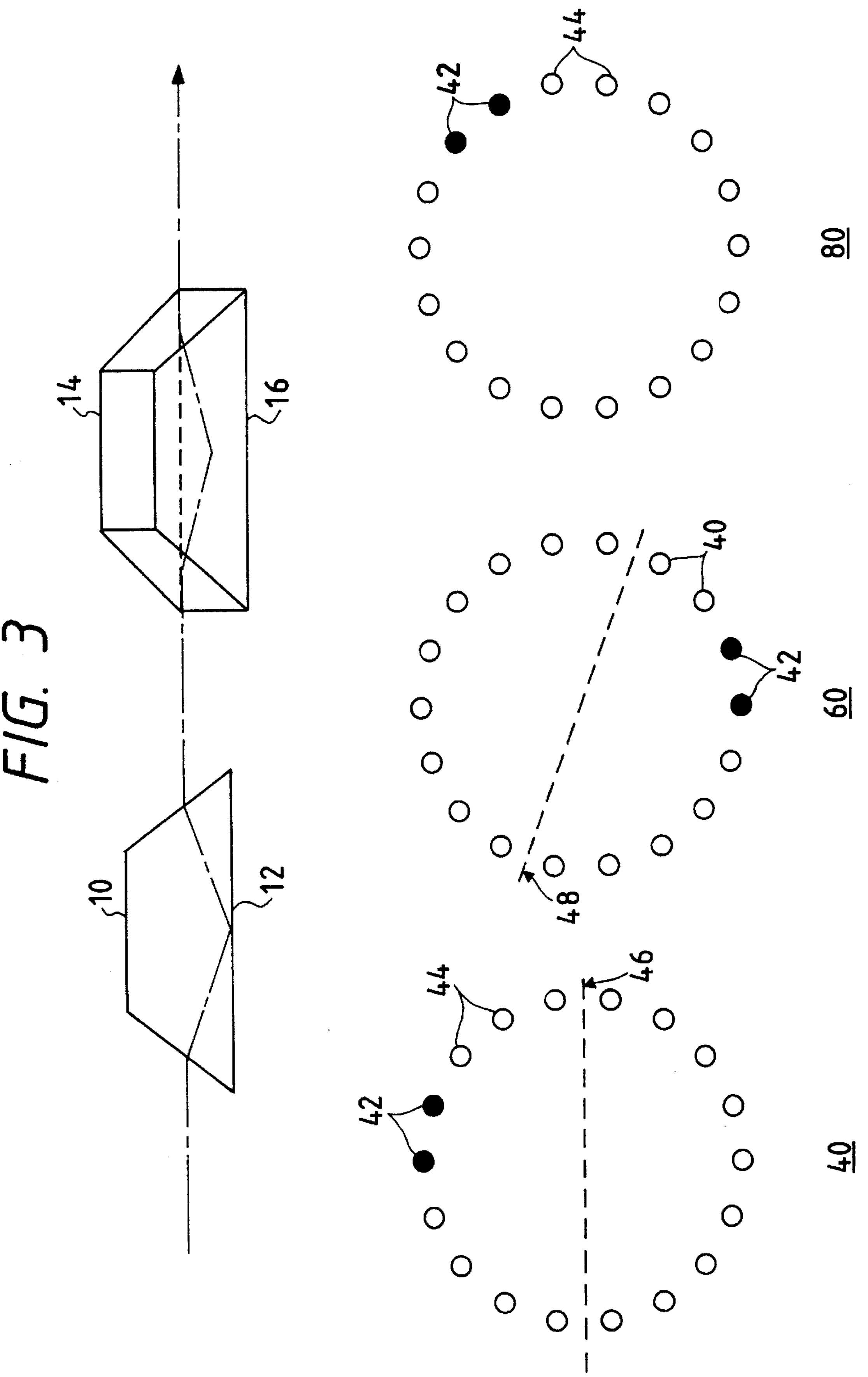
FIG. 3 is a schematic diagram of a data processing system having a single optical routing path according to an embodiment of the present invention.

Referring to FIG. 3, according to an embodiment of the present invention, to reduce the number of processing elements (e.g., constraint (1)), the interconnect system, as embodied herein, uses a plurality of Dove prisms optically aligned in cascade. For example, in FIG. 3, a first Dove prism 10 having a first base (or reflection) plane 12 and a second Dove prism 14 having a second base (or reflection) plane 16 are optically arranged in cascade. The areas of first and second base planes 12 and 16 are tilted at an angle with respect to one another.

At the input of first Dove prism 10, a ring distributed data array 40 of, for example, eighteen (18) pixels of uniform size is provided. Of the eighteen (18) pixels, two adjacent pixels are filled pixels 42 and the remaining sixteen pixels are empty pixels 44. Each pixel is distributed in a respective unit position along a circle having a diameter and uniformly spaced apart by a rotation unit from adjacent pixels.

For example, the positions of the pixels of data array 40 are symmetric with respect to an axis 46 corresponding to the axis of first base plane 12. First base plane 12 of first Dove prism 16 generates a flipped data array 60 in which the pixels of flipped data array 40 are flipped with respect to axis 46. Flipped data array 60 is provided as an input to second Dove prism 12.

Since second base plane 16 of second Dove prism 14 (or its corresponding axis 48 in data array 60) is tilted at a predetermined angle with respect to first base plane 12 (or its corresponding axis, axis 46), the positions of filled pixels 42 of a ring distributed data array 80 at the output of second Dove prism 14 are shifted by two rotation units clockwise along the circle from those of ring distributed data array 40.

According to the embodiment of the present invention, for a K unit rotation among N (N>K) uniformly distributed pixels along the data ring, a radian tilt angle $$\alpha=\frac{\pi K}{N} \tag{2}$$

between the base planes of the two Dove prisms is required. Since the system, as embodied herein, is rotationally invariant, multiple optical channels for each processing element can be used to increase the ring radial interconnect throughput, which will be described in more detail below.

To maintain fast communication and minimize interconnect cross-talk (e.g., constraints (3) and (4) above), the interconnect system, as embodied herein, incorporates additional optical elements. For example, a standard 8f optical imaging system (shown in FIG. 4, for example) can be optionally provided adjacent second base plane 16 of second Dove prism to obtain a high resolution image of the densly packed ring distributed data array 40, and a Dove prism can be optionally provided on each side of base planes 12 and 16.

Using a good quality 8f optical imaging system with an effective diameter D and a lens with F#=2 (where F#f/D,) and f is a focal length, and assuming a minimum crosstalk-free resolvable distance $p=(10\lambda f)/D$ (which is eight times longer than that specified by the diffraction-limited Rayleigh's criteria) along a circle of a diameter d of the interconnect network, M processing elements can be interconnected, where $$M=\frac{\pi D d}{10\lambda f} \tag{3}$$

For example, for $\lambda=0.6$ μm and D=d=1 cm, M=2500 processing elements can be connected. Using the same F#, the total longitudinal length of the 8f optical system is 16 cm. The corresponding propagation delay is about 0.5 ns.

The use of the 8f imaging system not only lends itself for the use of both a collimated and a point source (such as a laser-diode and a micro-laser) based interconnect, but also provides a constant latency for each processing element. To insure correct synchronization among the processing elements (e.g., constraint (4) above), the interconnect system, as embodied herein, uses geometric optical elements, and the data reach their destinations either simultaneously or within the system's aberration time limit, despite their different routing paths. Thus, even for a ultrahigh clock rate (e.g., over 100 GHz), clock skew is not a problem.

To provide bidirectional communication (e.g., constraint (5) above), the optical interconnect system, as embodied herein, may optionally include optical sources and detectors on either side of a processing element for providing the ring data array. For different rotation-invariant routing operations and for a uniform latency for each of the K unit rotation operations, the interconnect system, as embodied herein, may use a ring cavity 100 incorporating K optical routing paths.

Figure 4:
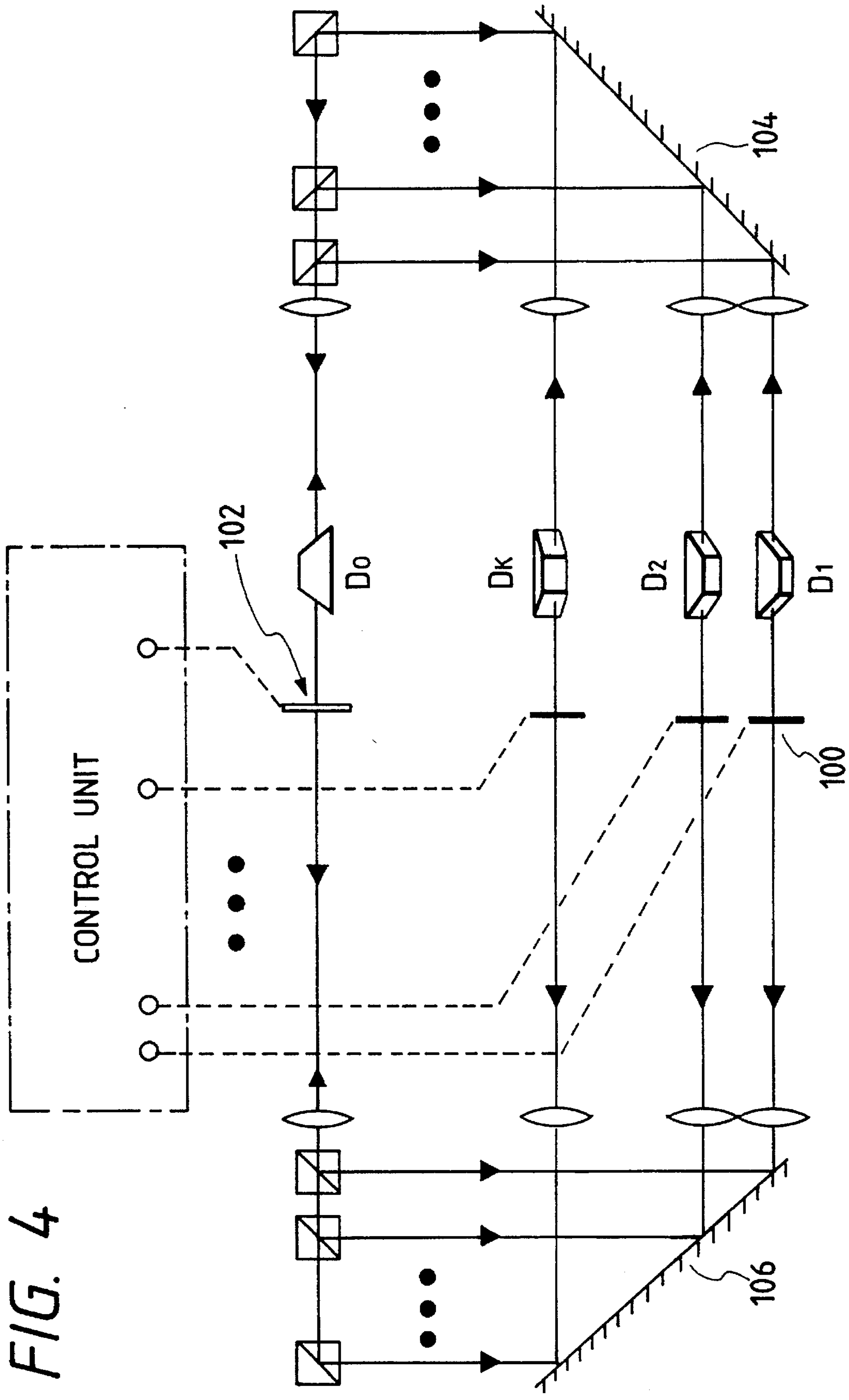
FIG. 4 is a schematic diagram of a data processing system having a multiple optical routing path according to another embodiment of the present invention.

According to another embodiment of the present invention and referring to FIG. 4, a base optical path includes a source and detector 102 coupled to the control unit for providing the optical ring data distribution array to a base prism $D^0$. Base prism $D^0$ transmits the optical ring data array bidirectionally through a lens on each side. The transmitted data array from base prism $D^0$ is split by K beam splitters on each side of base prism $D^0$. Each beam splitter directs the data array to a respective one of K routing paths after reflection by a respective one of mirrors 104 and 106. Each of the K routing paths includes a respective one of prisms $D^1, D^2, \ldots$ and $D_K$, and each prism has a base (or reflection) plane having an axis tilted at an angle with respect to the axis of the base plane of base prism $D^0$.

Each optical routing path includes a spatial light modulator (SLM) at the midpoint of the routing path (also 4f image plane) for controlling transmission of the data array. Each of the base path and the K routing paths includes an optical imaging system on each side of the prism for increasing image resolution. With this arrangement, due to Stokes' reversibility, identical bilateral (clockwise and counterclockwise beam propagation) communications for a particular routing path between the two processing elements can be established.

Since in each clock cycle, an identical SIMD interconnect operation is performed, to activate a particular routing path (e.g., $j^{th}$ routing function with $1\leqq j\leqq K$), the $j^{th}$ spatial light modulator (SLM) is activated (or switched) by the control unit to pass the data pattern while other SLMs are switched to blocking it. When more than one routing paths are needed, the corresponding SLMs are activated by the control unit. With this scheme, upon the received SIMD instructions, parallel data transition for all processing elements can be executed simultaneously.

Unlike a crossbar, here the use of K (K<N) routing paths does not permit the message to be sent to any destination in one clock cycle. This should not be a severe problem if the processing elements in the SIMD array do not exhibit heavy message traffic. The input source should have sufficient power when data are required to be sent simultaneously to all K processing elements. The actual implementation should therefore consider the loss mechanism associated with the free-space beam propagation, i.e. absorption, reflection, refraction, diffraction and vignetting-losses and the quantum efficiency of the detector. Fortunately, as compared to holographic schemes, the lens and prisms based geometric imaging system used here is much more power efficient.

Since the interconnect system of the present invention maps into a ring a densely packed two-dimensional array of processing elements, one disadvantage of this scheme is the inefficient use of the space-bandwidth product. However, by placing the electronic processing elements and their heat sinks in the circle's interior, the unused space can be utilized. It can be shown that to place 2500 processing elements in a 1 cm diameter ring, each processing element could occupy a practical chip area of 60×60 $\mu m^2$. Also, the physical separation of the optical interconnect from the electronic processing elements can ease the practical integration problems of very large scale integration (VLSI). At present, most electronic processors are integrated on silicon substrates while the high performance optical sources and detectors use most likely GaAs based technology which is incompatible with silicon for instance.

As described above, the optical interconnect of the present invention focuses on solving the present and near-term interconnect problem for medium to large-size SIMD processor or computer arrays using existing and commercially available devices and technology. As the optical routing scheme becomes more complex, this method becomes more competitive to its electronic counterparts. For example, at present, because of the interconnect latency problem, global interconnects such as the HCI network is difficult to achieve for a SIMD array of more than 256 processing elements because of the synchronization or clock-skew problems. Similarly, for a large processing element array, the PM2I network is usually implemented as a multistage ID data manipulator.

In the optical interconnect system of the present invention, 2500 processing elements can be linked without usual latency problems. The spirit of the present invention is that for many interconnect applications, the use of a ring instead of a linear or a rectangular array provides many distinctive advantages for a highly efficient optical implementation. The system of the present invention offers a simple, compact and unique means for an ultrafast rate optical interconnect.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A data processing system comprising:

a control unit providing data for processing a plurality of data processing elements electrically coupled to said control unit to process the data;

a plurality of interconnect network means formed in a ring array and having means for optically coupling said processing elements to one another through free space;

each interconnect network including:

input means, coupled to said control unit, for providing an input optical data array representing the data and having a plurality of non-overlapping pixels positioned along a reference circle to form a ring optical data array, each pixel having a position distanced one predetermined rotation unit from positions of adjacent pixels;

a first prism means optically coupled to said input means through free space and having a first reflection base plane for reflecting said optical data array to generate a reflected optical data array; and a second prism means optically aligned in cascade with the first prism means through free space and having a second reflection base plane having an axis inclined at an angle with respect to the axis of the first reflection base plane for reflecting said reflected optical data array to generate an output optical data array, wherein the position of each pixel of the output data array is shifted along the circle with respect to the position of a corresponding pixel of the input optical data array by one or more of said rotation units depending on the angle of inclination of the second reflection base plane.

2. The data processing system of claim 1, wherein the first prism means and the second prism means each includes a Dove prism.

3. The data processing system of claim 1, further comprising an optical means adjacent said first reflection base plane for focusing the input optical data array.

4. The data processing system of claim 3, further comprising an optical means adjacent said second reflection base plane for focusing the reflected optical data array.

5. A data processing system comprising:

a control unit providing data for processing;

a plurality of data processing elements electrically coupled to said control unit to process the data;

a plurality of interconnect network means formed in a ring array and having means for optically coupling said processing elements to one another through free space;

each interconnect network including:

input means, coupled to said control unit, for providing an input optical data array representing the data having a plurality of non-overlapping pixels positioned along a reference circle to form a ring optical data array, each pixel having a position distanced one predetermined rotation unit from positions of adjacent pixels;

a first prism means optically coupled to said input means through free space and having a first reflection base plane for reflecting said optical data array to generate a reflected optical data array; and a plurality of second prism means optically coupled to said first prism means through free-space, and each second prism means corresponding to a different optical, free space routing path and having a second reflection base plane having an axis inclined at an angle with respect to the axis of said first reflection base plane for reflecting said reflected optical data array to generate an output optical data array, wherein the position of each pixel of each output optical data array is shifted along the circle with respect to the position of a corresponding pixel of the input optical data array by one or more of said rotation units depending on the angle of inclination of the second reflection base plane.

6. The data processing system of claim 5, further comprising an optical means on each side of each of said first prism means and said plurality of second prism means.

7. The data processing system of claim 5, wherein said angle of inclination of each second reflection plane is greater than zero.

8. The data processing system of claim 5, further comprising a plurality of beam splitters adjacent said first prism means each optically coupled through free space to a respective one of the plurality of second prism means for directing said reflected optical data array thereto.

9. The data processing system of claim 5, wherein each of the first prism means and each of the plurality of second prism means includes a Dove prism.

10. The data processing system of claim 5, further comprising a spatial light modulator means adjacent each of said plurality of second prism means for controlling transmission of said output optical data array.

11. The data processing system of claim 5, further comprising a plurality of beam splitters each optically coupled through free space to a respective one of the plurality of second prism means on each side of the first prism means for directing said reflected optical data array bidirectionally through free space to said respective second prism means.

* * * * *

UNITED STATES PATENT AND TRADEMARK OFFICE

CERTIFICATE OF CORRECTION

PATENT NO. : 5,524,219

DATED : June 04, 1996

INVENTOR(S) : Yao LI

It is certified that error appears in the above-indentified patent and that said Letters Patent is hereby corrected as shown below:

Claim 1, column 7, line 11, after "processing" insert --;--.

Claim 5, column 8, line 17, "free-space" should read --free space--.

Claim 5, column 8, line 19, "free space" should read --free-space--.

Signed and Sealed this

Thirty-first Day of December, 1996

Attest:

BRUCE LEHMAN

*Attesting Officer*

*Commissioner of Patents and Trademarks*